United States Patent
Tsuchida

(10) Patent No.: US 11,297,194 B2
(45) Date of Patent: Apr. 5, 2022

(54) SUCTION DEVICE, PRINTER, AND CONVEYANCE DEVICE

(71) Applicant: Yorifumi Tsuchida, Kanagawa (JP)

(72) Inventor: Yorifumi Tsuchida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 16/878,388

(22) Filed: May 19, 2020

(65) Prior Publication Data
US 2020/0404112 A1    Dec. 24, 2020

(30) Foreign Application Priority Data
Jun. 19, 2019    (JP) ............................. JP2019-113309

(51) Int. Cl.
| | | |
|---|---|---|
| *B41J 11/00* | (2006.01) | |
| *B41J 11/02* | (2006.01) | |
| *B65H 5/22* | (2006.01) | |
| *H04N 1/00* | (2006.01) | |
| *B65H 5/14* | (2006.01) | |

(52) U.S. Cl.
CPC ........... *H04N 1/00607* (2013.01); *B65H 5/14* (2013.01); *B65H 2406/3663* (2013.01)

(58) Field of Classification Search
CPC ..... B41J 11/0085; B41J 11/06; B41J 11/0095; B41J 3/28; H04N 1/00607; B65H 2406/351; B65H 2406/3622; B65H 2406/3663; B65H 2553/10; B65H 2553/11; B65H 43/04; B65H 5/14; B65H 5/22; B65H 5/224; B65H 5/226; B65H 11/005; B65H 29/242; B65H 29/241; B65H 29/24

See application file for complete search history.

(56) References Cited

U.S. PATENT DOCUMENTS

| | | | | |
|---|---|---|---|---|
| 6,154,240 A | * | 11/2000 | Hickman | ............... B41J 11/003 271/276 |
| 6,460,991 B1 | * | 10/2002 | Temple | .................. B41J 13/226 271/183 |
| 10,322,904 B2 | * | 6/2019 | Arredondo | ............. B65H 29/52 |
| 2011/0193921 A1 | | 8/2011 | Chung et al. | |
| 2016/0107468 A1 | | 4/2016 | Leynadier et al. | |

FOREIGN PATENT DOCUMENTS

| | | | |
|---|---|---|---|
| JP | 57013043 A | * | 1/1982 |
| JP | 2001-069277 | | 3/2001 |
| JP | 2002145478 A | * | 5/2002 |
| JP | 2011020424 A | * | 2/2011 |
| JP | 2012030419 A | * | 2/2012 |
| JP | 2019-055858 | | 4/2019 |
| WO | WO2010/041911 A2 | | 4/2010 |
| WO | WO2014/207007 A1 | | 12/2014 |

* cited by examiner

*Primary Examiner* — Luis A Gonzalez
(74) *Attorney, Agent, or Firm* — Duft & Bornsen, PC

(57) ABSTRACT

A suction device includes a suction hole member including a plurality of suction holes, a suction pump connected to each of the plurality of suction holes, the suction pump configured to suction an air through the plurality of suction holes of the suction hole member to suction a suction target to the suction hole member, and a suction state detector configured to detect a suction state of at least one of the plurality of suction holes corresponding to an end of the suction target suctioned to the suction hole member.

8 Claims, 9 Drawing Sheets

SUCTION DEVICE, PRINTER, AND CONVEYANCE DEVICE

CROSS-REFERENCE TO RELATED APPLICATION

This patent application is based on and claims priority pursuant to 35 U.S.C. § 119(a) to Japanese Patent Application No. 2019-113309, filed on Jun. 19, 2019, in the Japan Patent Office, the entire disclosure of which is hereby incorporated by reference herein.

BACKGROUND

Technical Field

Aspects of the present disclosure relate to a suction device, a printer, and a conveyance device.

Related Art

A printer attracts a printing object on a bed (also referred to as a stage or table, for example) and the like and prints an image on the object while moving and scanning a printing unit such as a liquid discharge head in a main scanning direction and a sub-scanning direction.

A printer detects an air pressure inside the bed with a sensor and controls an operation of a suction pump according to a detection result of the sensor. The bed vacuums a printing object to fix the printing object on the bed.

SUMMARY

In an aspect of this disclosure, a suction device includes a suction hole member including a plurality of suction holes, a suction pump connected to each of the plurality of suction holes, the suction pump configured to suction an air through the plurality of suction holes of the suction hole member to suction a suction target to the suction hole member, and a suction state detector configured to detect a suction state of at least one of the plurality of suction holes corresponding to an end of the suction target suctioned to the suction hole member.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

Figure 1:
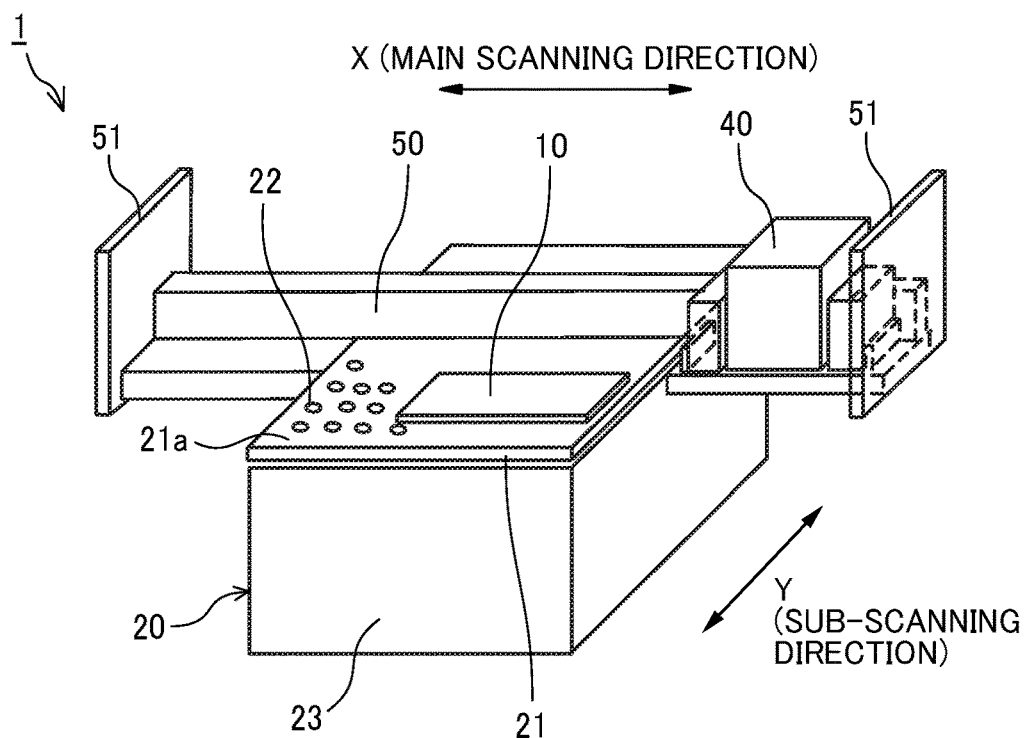
FIG. 1 is a schematic perspective view of a printer according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a," "an," and "the" are intended to include the plural forms as well, unless the context clearly indicates otherwise.

Figure 2:
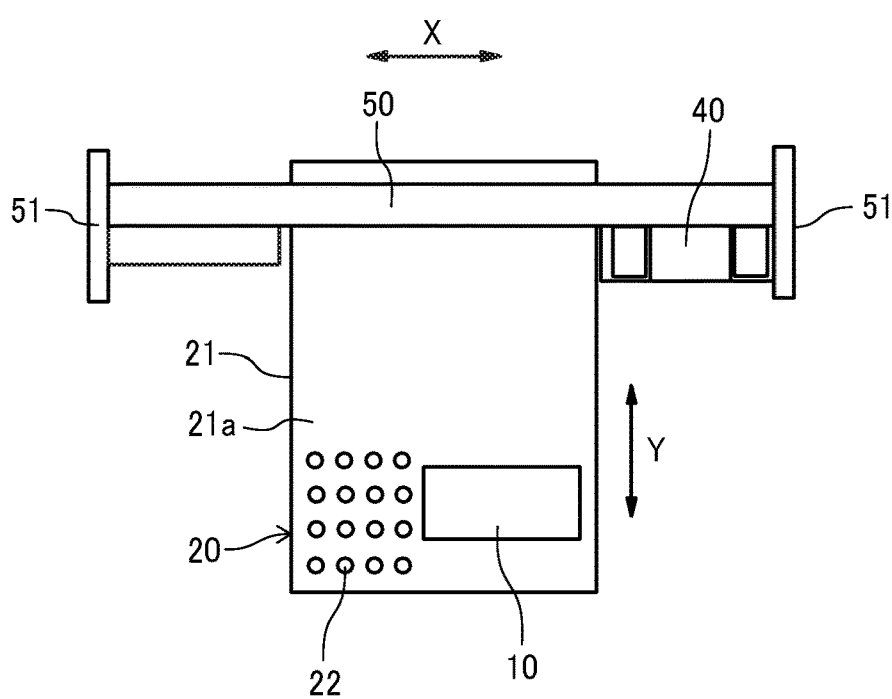
FIG. 2 is a plan view of the printer of FIG. 1.

Referring now to the drawings, wherein like reference numerals designate identical or corresponding parts throughout the several views, embodiments of the present disclosure are described below. A first embodiment of present disclosure is described with reference to FIGS. 1 and 2. FIG. 1 is a schematic perspective view of a printer 1 according to the first embodiment of the present disclosure. FIG. 2 is a plan view of the printer 1 of FIG. 1.

The printer 1 includes a suction device 20 including a bed 21 as a mount on which a suction target 10 serving as a printing object (member to be printed or a medium) is placed.

The bed 21 is a suction hole member that includes a plurality of suction holes 22 (only a part of which is illustrated in FIG. 1) opened on a mounting surface 21a of the bed 21. The suction target 10 is an object to be suctioned (attracted) to the bed 21 and is an object onto which a liquid is discharged to form an image on the suction target 10. The bed 21 vacuums an air from the plurality of the suction holes 22 of the bed 21 with the suction device 20 disposed inside a structure 23 of the suction device 20 to generate a suction force on the mounting surface 21a so that the suction target 10 placed on the mounting surface 21a of the bed 21 is attracted to the bed 21.

The printer 1 includes a gantry 50 to hold the carriage 40 so that the carriage 40 is reciprocally movable in a first direction X (main scanning direction) with respect to the mounting surface 21a of the bed 21 and side plates 51 to hold the gantry 50. The carriage 40 mounts a printing device such as a liquid discharge head 41 (see FIG. 11) on the carriage 40.

Hereinafter, the "liquid discharge head 41" is simply referred to as the "head 41." Note that the printing device in the printer 1 is not limited to the liquid discharge head. The gantry 50 is held between the side plates 51.

The gantry 50 is reciprocally movable relative to the mounting surface 21a of the bed 21 in a second direction Y (sub-scanning direction) perpendicular to the first direction X (main scanning direction). The printer 1 reads a sub-scanning encoder sheet on both sides of the suction device 20 with a sub-scanning encoder sensor on the gantry 50 to control movement of the gantry 50.

The printer 1 attracts and fixes the suction target 10, that is placed on the mounting surface 21a of the bed 21, onto the mounting surface 21a. Then, the printer 1 discharges a liquid from the head 41 to form an image of one line while reciprocally moving the carriage 40 in the main scanning direction X. Then, the gantry 50 moves by one line to form an image of the next line. The above-descried operation is repeated to print a desired image on the suction target 10.

Figure 3:
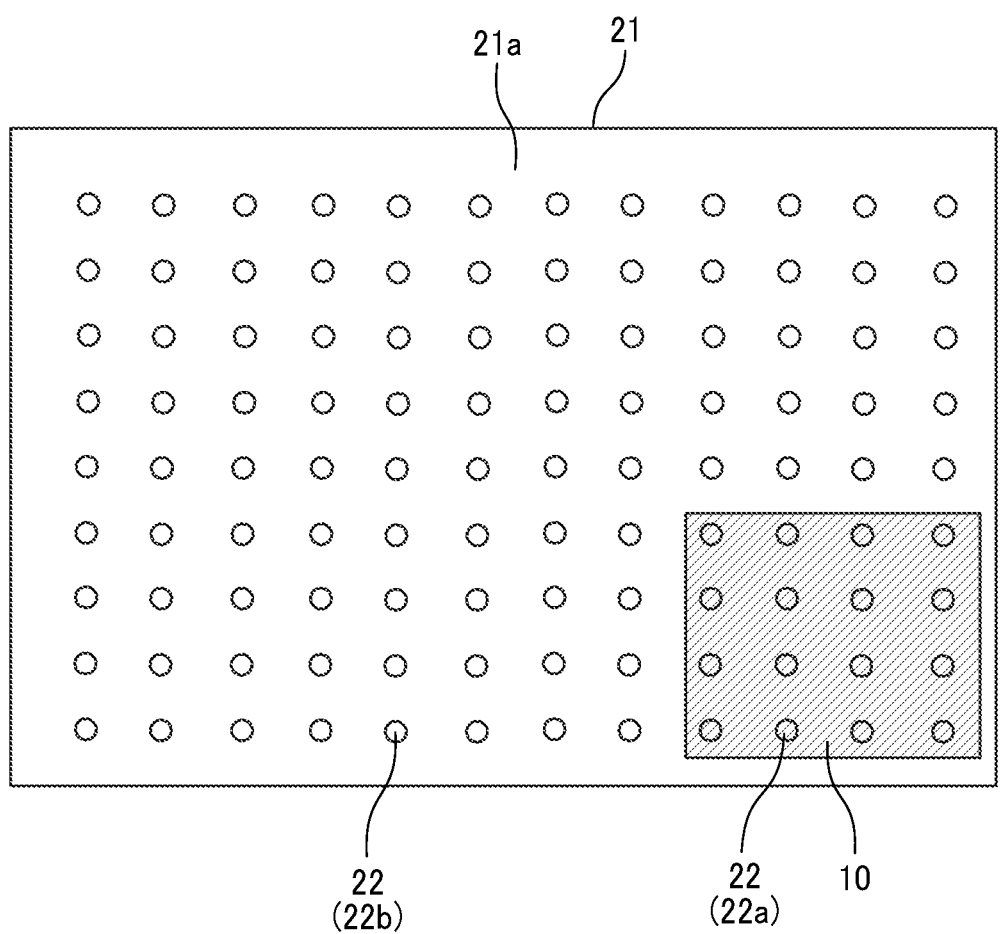
FIG. 3 is a schematic plan view of a bed of a suction device according to the first embodiment of the present disclosure.
Figure 4:
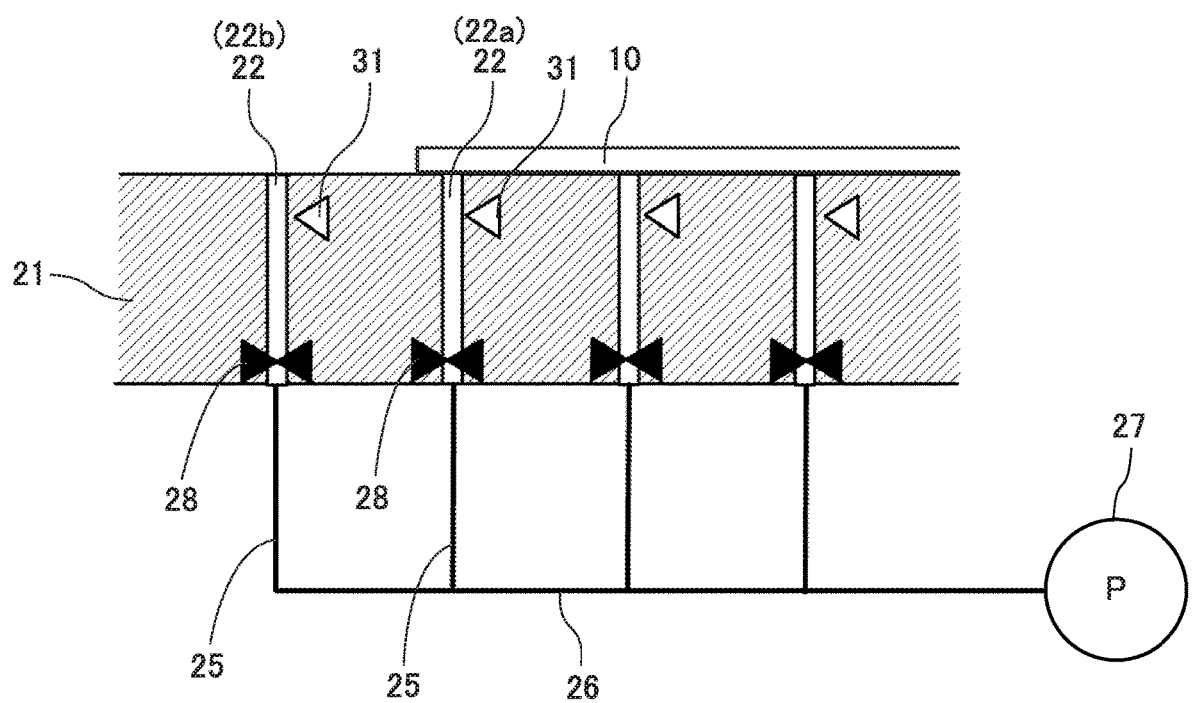
FIG. 4 is a portion of an enlarged cross-sectional view of the suction device.

Next, the suction device 20 according to the present embodiment is described with reference to FIGS. 3 and 4. FIG. 3 is a schematic plan view of the bed 21 of the suction device 20. FIG. 4 is a portion of an enlarged cross-sectional view of the suction device 20.

As described above, the bed 21 includes the plurality of suction holes 22. Each suction hole 22 is connected to a suction pump 27 via an individual suction path 25 and a common suction path 26. The common suction path 26 is connected to each of a plurality of the individual suction paths 25. The suction pump 27 serves as a suction unit to suction an air through the plurality of suction holes 22 of the bed 21.

Each of the plurality of suction holes 22 includes a valve 28 serving as an opening and closing device. The printer 1 opens the valves 28 to respectively connect the suction holes 22 and the individual suction paths 25 while operating the suction pump 27 so that an air is vacuumed through the suction holes 22 to the suction pump 27.

Further, the bed 21 includes an air velocity sensor 31 in each of the plurality of suction holes 22. The air velocity sensor 31 serves as a suction state detector to detect a velocity of the air flowing through the suction hole 22. Hereinafter, the "velocity of the air flowing through the suction hole 22" is simply referred to as the "air velocity" or the "wind speed").

As illustrated in FIG. 3, the air flows through the suction holes 22b that are not closed (covered) by the suction target 10 while the air does not flow or flow slowly (small movement of the air) through the suction holes 22b closed (covered) by the suction target 10 (shaded area in a lower right part in FIG. 3) during attraction (vacuuming) of the suction target 10 onto the mounting surface 21a of the bed 21. Thus, the printer 1 detects the air velocity (wind speed) in the suction hole 22 with the air velocity sensor 31 to detect a suction state of the suction hole 22 such as whether the suction hole 22 is closed (covered) by the suction target 10.

Figure 5:
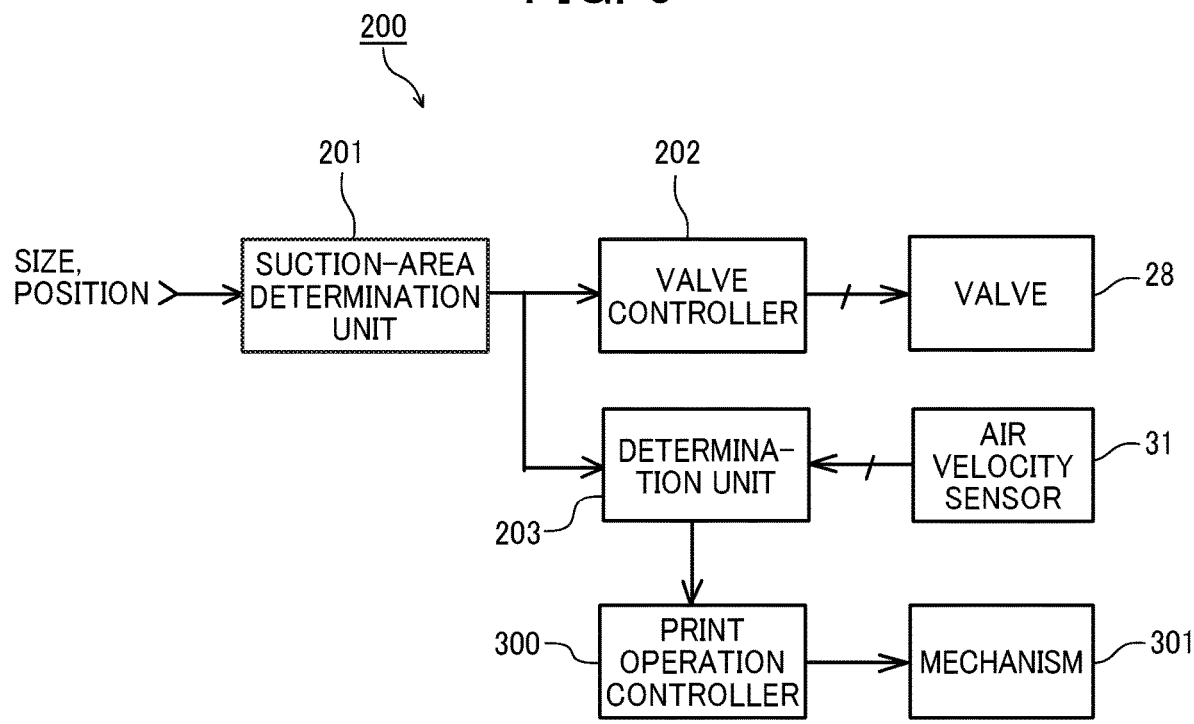
FIG. 5 is a circuit diagram of parts related to a detection of floating of a suction target and a control of a print operation according to the first embodiment of the present disclosure.

Next, a control of detection of a floating of the suction target 10 and a printing operation in the present embodiment is described with reference to FIG. 5. FIG. 5 is a schematic circuit diagram of a controller 200 of the printer 1.

The controller 200 includes a suction-area determination unit 201 that determines a suction area based on a size and a mounting position of the suction target 10 input to the suction-area determination unit 201.

The controller 200 further includes a valve controller 202 that opens the valve 28 in the suction hole 22 within the suction area determined by the suction-area determination unit 201 to communicate the suction hole 22 with the suction pump 27.

The determination unit 203 inputs a detection result of the air velocity sensor 31 in the suction holes 22 belonging to the suction area determined by the suction-area determination unit 201 and determines whether the suction state of suction holes 22 belonging to the suction area are identical. Thus, the determination unit 203 determines whether the suction state of all the suction holes 22 in the suction area that includes each end (edge) of the suction target 10 are identical in the printer 1 according to the present embodiment.

The controller 200 further includes a print operation controller 300 that drives a mechanism 301 (engine unit) to control the printing operation. The mechanism 301 moves the carriage 40 in the first direction X (main scanning direction), moves the gantry 50 in the second direction Y (sub-scanning direction), drives the head 41, and the like.

The print operation controller 300 controls to stop the printing operation when the determination unit 203 determines that the suction states of the suction holes 22 belonging to the suction area are not identical.

Each of the functions of the controller 200 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Figure 6:
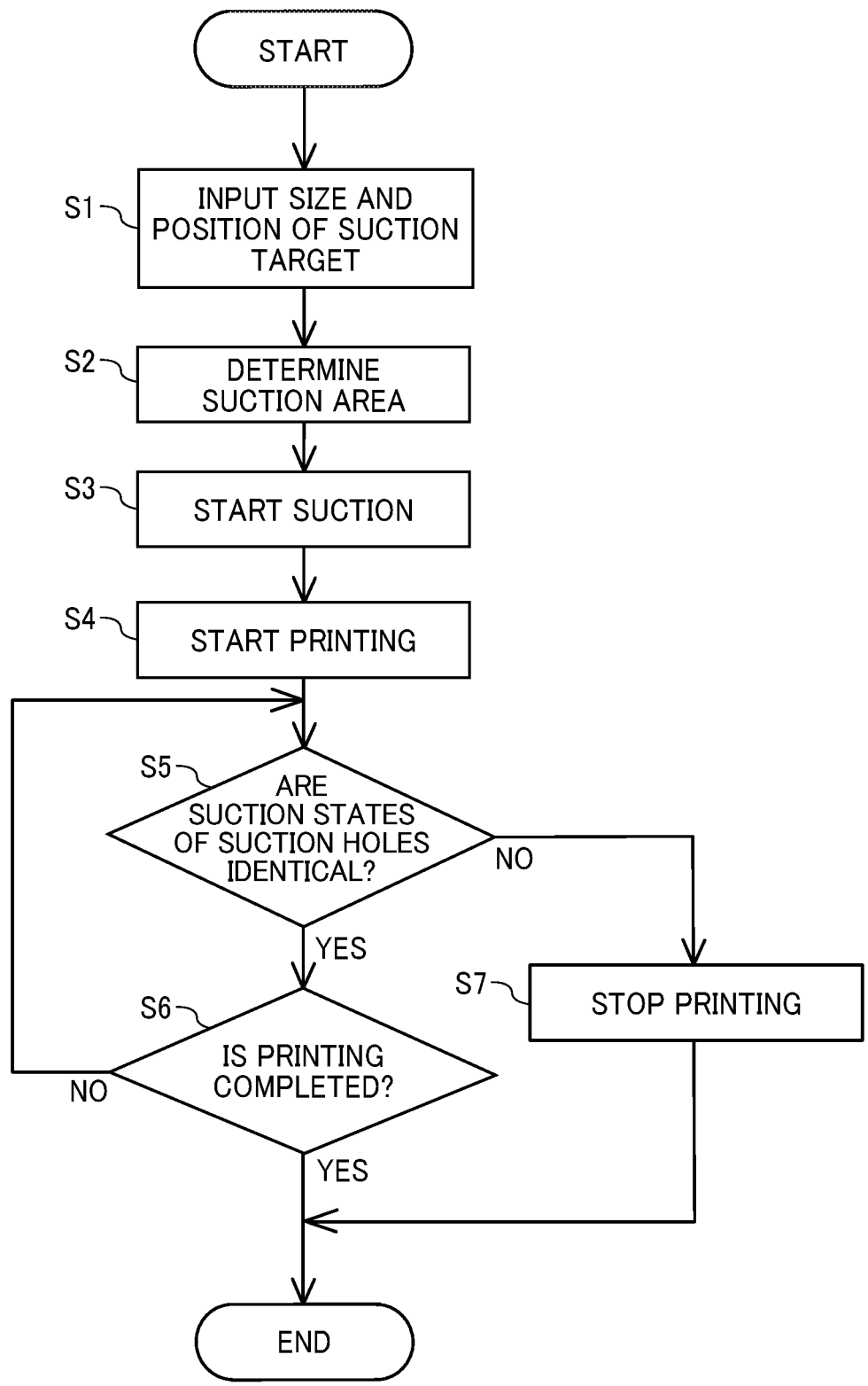
FIG. 6 is a flowchart illustrating the control of the printing operation according to the first embodiment of the present disclosure.
Figure 7:
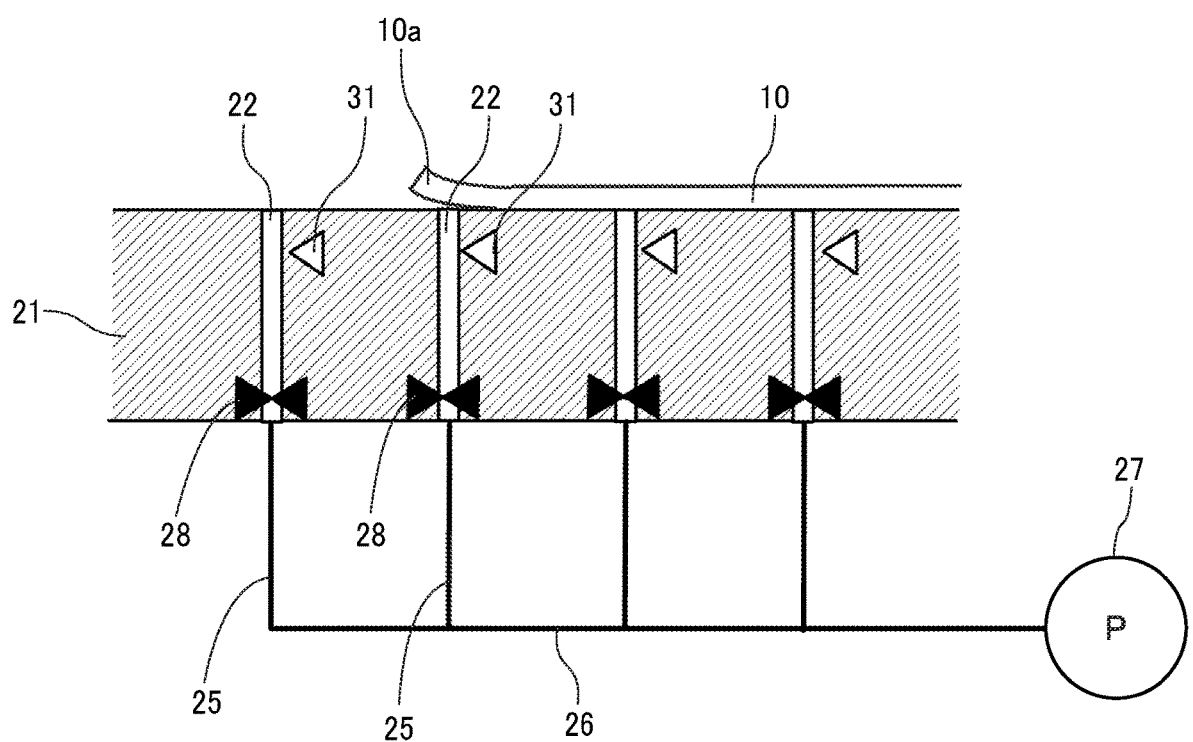
FIG. 7 is a portion of an enlarged schematic cross-sectional view of the bed illustrating a state in which floating of an end of the suction target from a mounting surface occurs.

Next, control of the printing operation according to the present embodiment is described with reference to FIGS. 6 and 7. FIG. 6 is a flowchart of the control of the printing operation by the controller 200. FIG. 7 is a portion of an enlarged schematic cross-sectional view of the bed 21 illustrating a state in which floating of an end 10a of the suction target 10 from the mounting surface 21a occurs.

First, the size of the suction target 10 and the mounting position of the suction target 10 on the mounting surface 21a are input to the suction-area determination unit 201 (step S1). Hereinafter, the step S1 is simply referred to as "S1". Then, the suction-area determination unit 201 determines the suction area based on the size of the suction target 10 and the mounting position of the suction target 10 on the mounting surface 21a (S2).

Next, the controller 200 drives the suction pump 27, and the valve controller 202 opens the valve 28 in the suction hole 22 in the suction area to start suction of the suction target 10 in the suction area (S3). Then, the print operation controller 300 starts printing on the suction target 10 (S4).

Then, the determination unit 203 determines whether the suction states of the suction holes 22 in the suction area are identical (S5).

For example, as illustrated in FIG. 4 as described above, the detection results of the air velocity sensors 31 in the suction holes 22a within the suction area are identical when the floating of the end 10a of the suction target 10 does not occur. Conversely, as illustrated in FIG. 7, the detection results of the air velocity sensors 31 of the suction holes 22 in the suction are different when the floating of the end 10a of the suction target 10 occurs.

Thus, if the suction states of suction holes 22 in the suction area are identical, the controller 200 determines whether the printing is completed (S6). If the printing is not completed (S6, NO), a control process returns to step S5. If the printing is completed (S6, YES), the control process ends.

Conversely, if the suction states of the suction holes 22 in the suction area are not identical, the controller 200 determines that the floating of the suction target 10 occurs and stops the printing operation (S7).

As described above, the controller 200 stops the printing operation when the suction failure (floating of the suction target 10) is detected so that the controller 200 can prevents problems such as collision (interference) of the suction target 10 with the printing device (head 41).

Further, the printer 1 can notify to the user an occurrence of the suction failure when the printer 1 detects the suction failure such as a floating of the suction target 10 from the mounting surface 21*a*.

Further, the printer 1 may increase a suction force of the suction pump 27 when the suction failure (floating of the suction target 10) is detected.

Thus, the printer 1 includes the determination unit 203 to determine whether the suction target 10 floats from the mounting surface 21*a* of the bed 21 (suction hole member) based on a detection result of the air velocity sensor 31 (suction state detector), and the controller 200 (circuitry) to perform at least one of stopping a printing operation that prints the image on the suction target 10, notifying an occurrence of a suction failure, and increasing a suction force of the suction pump 27, when the determination unit 203 determines that the suction target 10 floats from the bed 21 (suction hole member).

Thus, the printer 1 includes the controller 200 (circuitry) to determine whether the suction target floats from the bed 21 (suction hole member) based on a detection result of the air velocity sensor 31 (suction state detector), and perform at least one of: stopping a printing operation to print the image on the suction target 10; notifying an occurrence of a suction failure; and increasing a suction force of the suction pump 27, on determination that the suction target 10 floats from the bed 21 (suction hole member).

Figure 8:
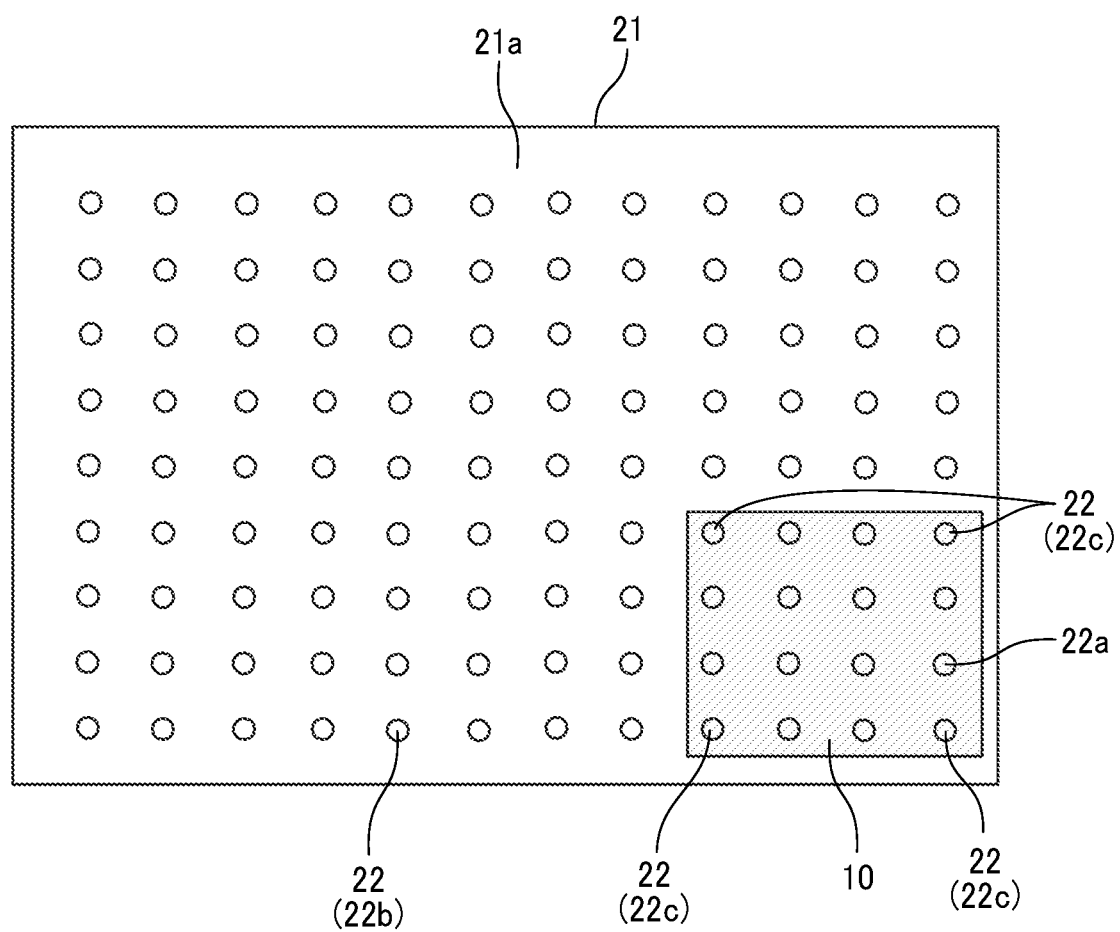
FIG. 8 is a schematic plan view of the bed and the suction target illustrating the suction holes used for detecting a suction state of the suction target according to the second embodiment of the present disclosure.
Figure 9:
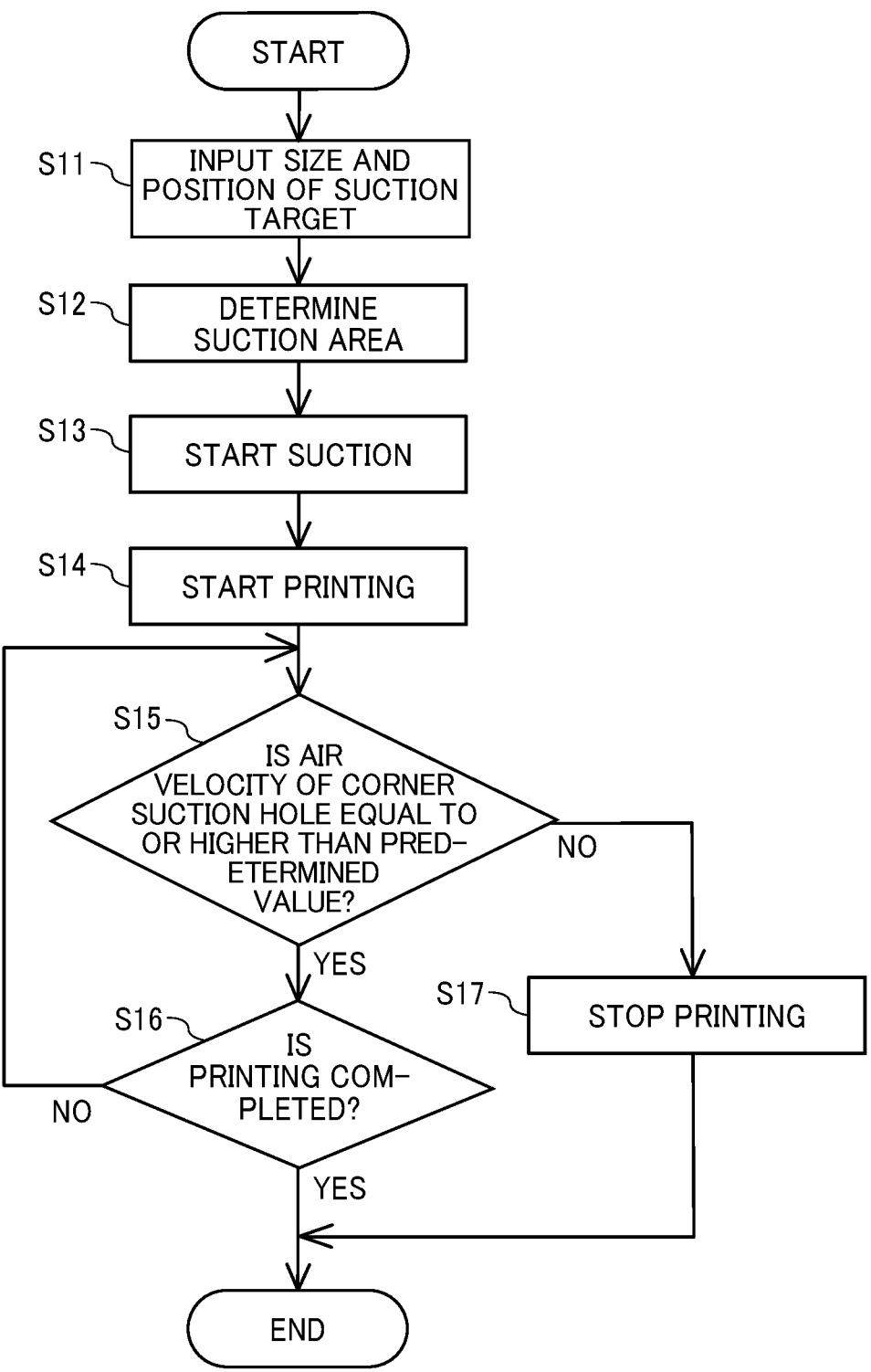
FIG. 9 is a flowchart of a control of a printing operation according to the second embodiment of the present disclosure.

A second embodiment of the present disclosure is described with reference to FIGS. 8 and 9. FIG. 8 is a schematic plan view of the bed 21 and the suction target 10 illustrating the suction holes 22 used for detecting the suction states of the suction target 10 according to the second embodiment of the present disclosure. FIG. 9 is a flowchart of control of the printing operation in the second embodiment of the present disclosure.

As illustrated in FIG. 8, the printer 1 according to the second embodiment detects the suction states of corner suction holes 22*c* corresponding to corners (four corners) of the suction target 10 with the air velocity sensors 31 (suction state detectors). The printer 1 in the second embodiment detects the suction states of the corner suction holes 22*c* of the four corners since the floating of the suction target 10 easily occurs at the corners of the suction target 10.

Then, referring to FIG. 9, the size of the suction target 10 and the mounting position of the suction target 10 on the mounting surface 21*a* are input to the suction-area determination unit 201 as in the first embodiment (S11). Then, the suction-area determination unit 201 determines the suction area based on the size and position of the suction target 10 input to the suction-area determination unit 201 (S12).

Next, the controller 200 drives the suction pump 27 and the valve controller 202 opens the valve 28 in the suction hole 22 in the suction area to start suction in the suction area (S13). Then, the print operation controller 300 starts printing on the suction target 10 (S14).

Then, the determination unit 203 checks whether there is an air velocity equal to or higher than a predetermined value in each of the corner suction hole 22*c* corresponding to the four corners of the suction target 10 among the suction holes 22 in the suction area from the detection results of the air velocity sensors 31 in each of the suction hole 22 so that the determination unit 203 determines whether the floating of the end of the suction target 10 occurs (S15).

Then, if floating does not occur on the end (four corners) of the suction target 10 (S15, YES), the controller 200 determines whether the printing has been completed (S16). If the printing is not completed (S16, NO), the controller 200 returns the process to step S15. If the printing is completed (S16, YES), the controller 200 ends the process of the printing operation.

Conversely, if the floating occurs on the end (four corners) of the suction target 10 (S15, NO), the controller 200 stops the printing operation (S17).

As described above, the printer 1 can prevent a problem of the floating of the suction target 10 from the mounting surface 21*a* only by checking the suction state of the suction holes 22 corresponding to specific portions (four corner in the present embodiment) of the suction target 10. Specifically, the printer 1 checks the suction state of the corner suction holes 22*c* to determine whether the floating of the end 10*a* of the suction target 10 occurs. Further, the printer 1 may also detect the suction state of the corner suction holes 22*c* corresponding to one to three corners of the suction target 10 based on a positional relationship between the corners of the suction target 10 and the corner suction holes 22*c*. Further, the printer 1 can detect the suction state of the suction holes 22 corresponding to the end 10*a* (edge) of the suction target 10.

Figure 10:
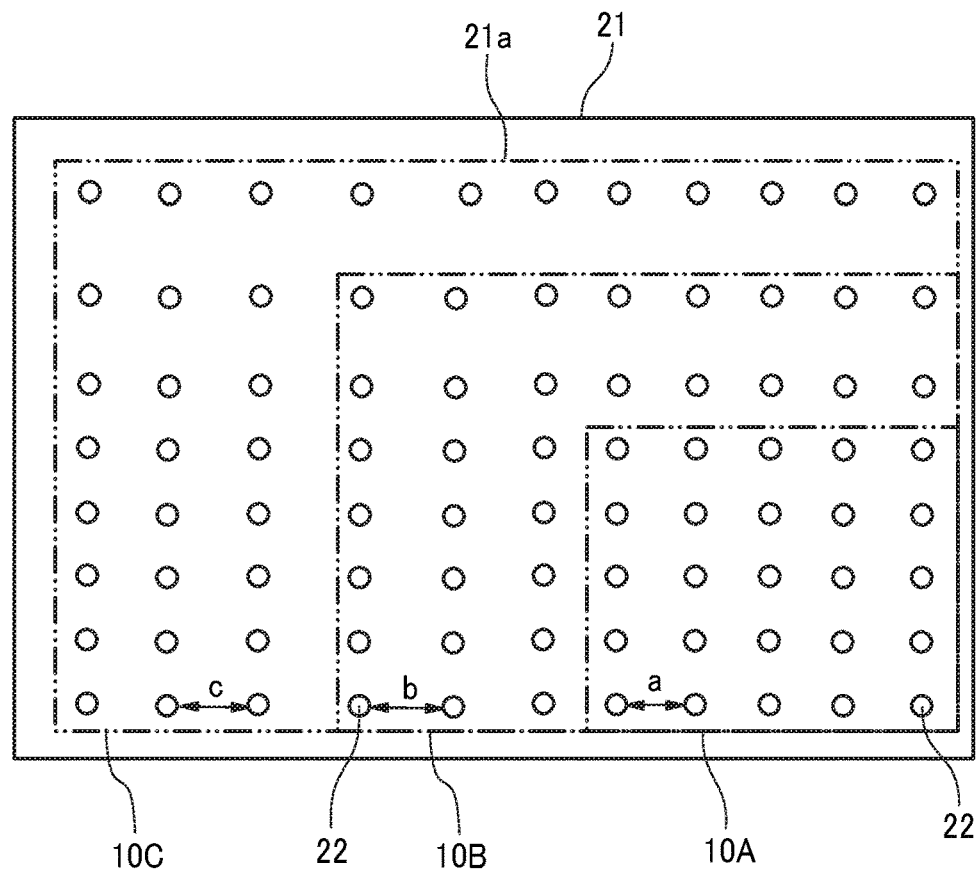
FIG. 10 is a schematic plan view of the bed and the suction target illustrating an arrangement of suction holes according to a third embodiment of the present disclosure.

A third embodiment according to the present disclosure is described with reference to FIG. 10. FIG. 10 is an enlarged plan view of an arrangement of the suction holes 22 according to the third embodiment of the present disclosure.

The printer 1 according to the third embodiment includes the suction holes 22 corresponding to each end of the suction objects 10A, 10B, and 10C that have standardized size. In the third embodiment, the suction holes 22 are not arranged at regular intervals, but are arranged at irregular intervals, for example, at intervals "a", "b", and "c" as indicated in FIG. 10.

Thus, the bed 21 (suction hole member) includes the plurality of suction holes 22 in a vicinity of an end of the suction target 10 having a standardized size.

The printer 1 having a configuration in the third embodiment can reduce the floating of the ends (corners) of the suction target 10 from the mounting surface 21*a*.

Figure 11:
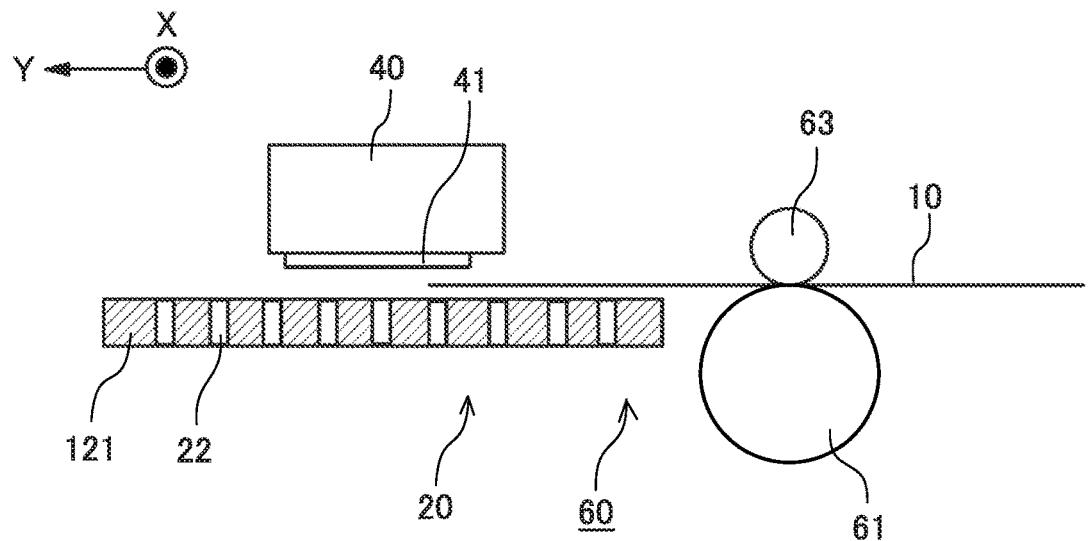
FIG. 11 is a schematic cross-sectional view of the printer according to a fourth embodiment of the present disclosure.

A fourth embodiment according to the present disclosure is described with reference to FIG. 11. FIG. 11 is a cross-sectional view of the printer 1 according to the fourth embodiment of the present disclosure.

The printer 1 is a serial-type printing apparatus. The printer 1 includes a carriage 40 mounting the head 41 reciprocally movable in the X direction (main scanning direction) and a conveyance device 60. The conveyance device 60 includes a conveyance roller 61 and a counter roller 63 that convey the suction target 10 in the Y direction and the suction device 20. The conveyance roller 61 and a counter roller 63 serve as a conveyor in the fourth embodiment.

The suction device 20 includes a suction hole member 121 that supports the suction target 10 as a target to be printed. The suction hole member 121 faces a moving area of the carriage 40. The suction hole member 121 includes the plurality of suction holes 22. The printer 1 includes the air velocity sensors 31 as in the above-described embodiments in each suction hole 22. The air velocity sensor (suction state detector) detects the air velocity of the air flowing through each suction hole 22.

The printer 1 having a configuration according to the fourth embodiment can specify the suction holes 22 corresponding to the ends of the suction target 10 from an amount of conveyance of the suction target 10 even though the suction holes 22 corresponding to the end of the suction holes 22 change with the conveyance of the suction target 10.

Thus, as described in the above embodiments, the printer 1 can determine whether the end 10a of the suction target 10 floats above the mounting surface 21a based on the detection result of the air velocity sensors 31.

The printer 1 each of the above-described embodiments use the air velocity sensor 31 as an example of a device to detect a suction state of the suction device 20. However, the printer may use an optical sensor to detect the suction state of the suction device 20 in a configuration in which a light quantity in the suction hole 22 changes between a closed state in which the suction holes 22 are closed (covered) by the suction target 10 and an opened state in which the suction holes are not closed (covered) by the suction target 10. Further, the printer 1 may detect a suction pressure in each suction hole 22 to detect the suction state of each suction hole 22.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A suction device comprising:
a suction hole member including a plurality of suction holes;
a suction pump connected to each of the plurality of suction holes, the suction pump configured to suction an air through the plurality of suction holes of the suction hole member to suction a suction target to the suction hole member; and
suction state detectors that each measure airflow through and are disposed within a corresponding one of the plurality of suction holes, and are each configured to detect a suction state of a corresponding suction hole corresponding to an end of the suction target suctioned to the suction hole member
wherein each of the suction state detectors is an air velocity sensor configured to detect a velocity of the air flowing through the plurality of suction holes.

2. The suction device according to claim 1, wherein each of the suction state detectors detects the suction state of one of the plurality of suction holes corresponding to a corner of the suction target.

3. The suction device according to claim 1, wherein each of the suction state detectors detects whether the plurality of suction holes is closed by the suction target.

4. The suction device according to claim 1, wherein the suction hole member includes the plurality of suction holes in a vicinity of the end of the suction target having a standardized size.

5. A printer comprising:
the suction device according to claim 1; and
a printing device configured to print an image on the suction target suctioned to the suction hole member.

6. The printer according to claim 5, further comprising circuitry configured to:
determine whether the suction target floats from the suction hole member based on a detection result of the suction state detector; and
perform at least one of:
stopping a printing operation to print the image on the suction target;
notifying an occurrence of a suction failure; and
increasing a suction force of the suction pump,
on determination that the suction target floats from the suction hole member.

7. A conveyance device comprising:
the suction device according to claim 1, and
a conveyor configured to convey the suction target along the suction hole member.

8. The conveyance device according to claim 7, further comprising circuitry configured to:
determine whether the suction target floats from the suction hole member based on a detection result of the suction state detector; and
perform at least one of:
notifying an occurrence of a suction failure; and
increasing a suction force of the suction pump,
on determination that the suction target floats from the suction hole member.

* * * * *